(12) United States Patent
Henry

(10) Patent No.: US 9,814,175 B2
(45) Date of Patent: Nov. 14, 2017

(54) AGRICULTURAL AIR CART ASSEMBLY WITH INDIVIDUALLY CONTROLLABLE AIR FLOW IN THE PRODUCT DISTRIBUTION LINES

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon (CA)

(*) Notice: Subject to any disclaimer, the term of this patent is extended or adjusted under 35 U.S.C. 154(b) by 115 days.

(21) Appl. No.: 14/591,304

(22) Filed: Jan. 7, 2015

(65) Prior Publication Data
US 2016/0192581 A1 Jul. 7, 2016

(51) Int. Cl.
| A01C 7/08 | (2006.01) |
|---|---|
| A01C 7/10 | (2006.01) |
| A01C 7/20 | (2006.01) |
| B65G 53/66 | (2006.01) |

(52) U.S. Cl.
CPC .............. *A01C 7/102* (2013.01); *A01C 7/081* (2013.01); *B65G 53/66* (2013.01)

(58) Field of Classification Search
CPC .......... A01C 7/084; A01C 7/081; A01C 7/08; A01C 7/00; A01C 7/20; B65G 53/66; B65G 53/34; B65G 53/00
See application file for complete search history.

(56) References Cited

U.S. PATENT DOCUMENTS

| 2,012,017 | A | 8/1935 | Oetjen |
|---|---|---|---|
| 4,296,695 | A | 10/1981 | Quanbeck |
| 5,979,343 | A | 11/1999 | Gregor et al. |
| 5,996,516 | A | 12/1999 | Benneweis et al. |
| 6,192,813 | B1 | 2/2001 | Memory et al. |
| 6,308,646 | B1 | 10/2001 | Luxon |
| 6,644,225 | B2 | 11/2003 | Keaton |
| 6,851,377 | B2 | 2/2005 | Mayerle et al. |
| 7,140,311 | B2 | 11/2006 | Brueggen |
| 7,373,890 | B2 | 5/2008 | Kowalchuk |
| 7,665,409 | B2 | 2/2010 | Johnson |
| 2010/0017073 | A1 | 1/2010 | Lankphair |
| 2012/0103238 | A1 | 5/2012 | Beaujot et al. |
| 2012/0174843 | A1 | 7/2012 | Friggstad |
| 2013/0085598 | A1 | 4/2013 | Kowalchuk |

FOREIGN PATENT DOCUMENTS

| DE | 575416 | 4/1933 |
|---|---|---|
| WO | WO2008155234 | 12/2008 |

*Primary Examiner* — Christopher J Novosad
(74) *Attorney, Agent, or Firm* — Rebecca L. Henkel; Rickard K. DeMille

(57) ABSTRACT

The agricultural product application equipment, and in particular, to an agricultural air cart assembly where each distribution line is a self-contained unit with movable shroud portion that provides greater airflow control in each of the product distribution lines.

6 Claims, 6 Drawing Sheets

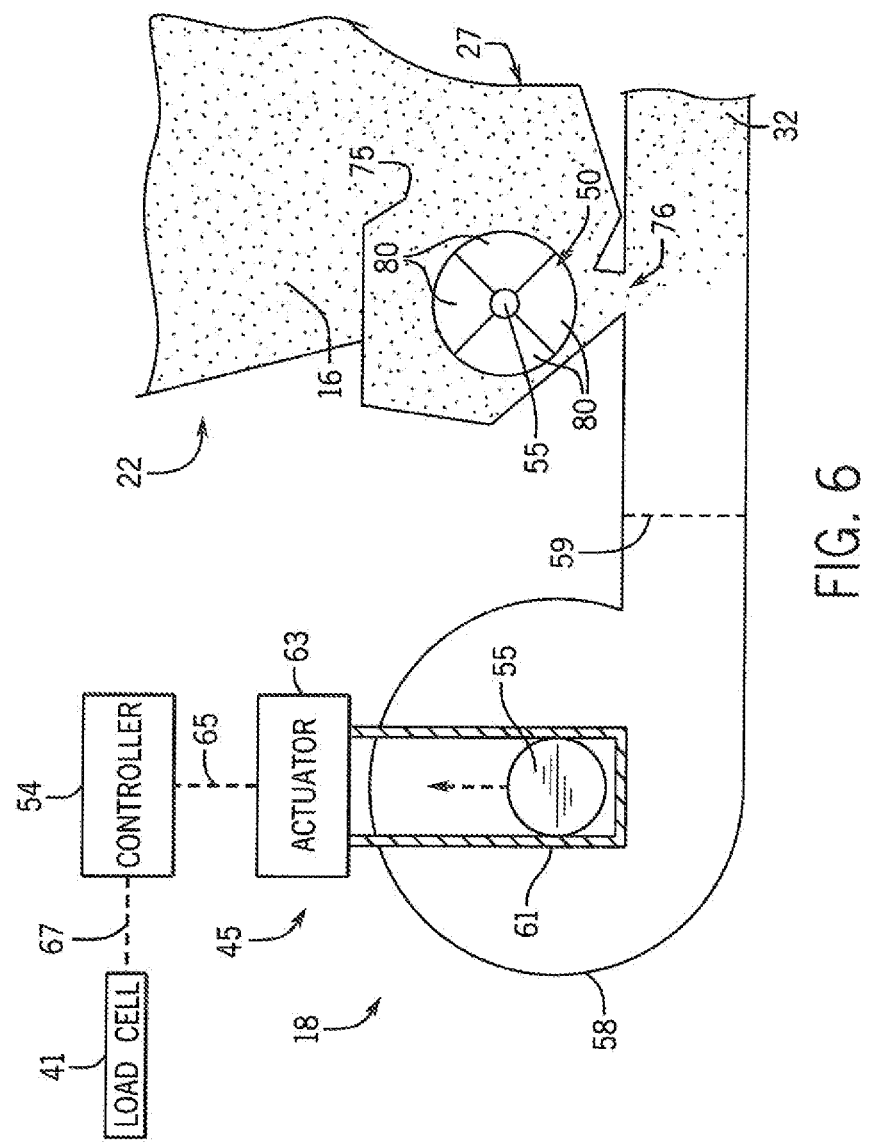

AGRICULTURAL AIR CART ASSEMBLY WITH INDIVIDUALLY CONTROLLABLE AIR FLOW IN THE PRODUCT DISTRIBUTION LINES

FIELD OF THE INVENTION

The invention relates generally to agricultural product application equipment, and in particular, to an agricultural air cart assembly with individually controllable air flow in the product distribution lines

BACKGROUND OF THE INVENTION

Conventional agricultural seeders are often employed to deposit planting material into soil. Many seeders include a material dispensing implement that is towed behind a tractor or similar vehicle for distributing planting material, such as seed, fertilizer, pesticide, and other chemicals and materials, onto a furrowed farmland or similar planting surface. The implement may consist of multiple dispensing units or opener units that are supported by a common or shared frame that is towed by the tractor.

Agricultural seeders may include one or more ground engaging tools or openers that form a seeding path for planting material deposition into the soil. The openers are used to break the soil to enable seed deposition. After the planting material is deposited, each opener is followed by a packer wheel that packs the soil on top of the deposited material. Seeders commonly use pneumatic systems to transport planting material from a storage hopper to the soil to be deposited. Typically, air flow is provided through tubes or distribution lines to transport product therethrough.

In certain configurations, an air cart is used to meter and transport the planting material (e.g., seeds, fertilizer, etc.) to ground engaging tools within the seeding implement. The air cart may include a hopper having one or more compartments configured for holding various planting material. Certain air carts include a metering system configured to deliver metered quantities of material into a tube or distribution line that transfers the material to the openers. The metering system will control distribution from the one or more compartments of the hopper to distribution lines such that each compartment provides planting material at a desired rate. Typically, an air cart includes a single large fan which supplies air flow to all distribution lines for pneumatic delivery of the planting material therethrough. From the distribution lines, air flow is diverted into primary distribution manifolds to secondary distribution manifolds that then feed the distribution lines which deliver the planting material to individual opener units.

Using a single fan to supply air to multiple distribution lines may be limiting with respect to controlling the distribution of various planting material to different opener units. More specifically, the use of a single fan to supply air to multiple distribution lines can result in uneven dispersal of air in the distribution lines. Further, in order to insure that the air pressure in the distribution lines is consistent, all the distribution lines are the same length, regardless of the distance between the air cart to the secondary distribution manifolds. As a result, most pneumatic systems require distribution lines of excess length, thereby adding expense to the system and cluttering the equipment cluttered. As such, a more accurate and reliable method of distributing air is needed.

Therefore, it is a primary object and feature of the present invention to provide an agricultural air cart assembly with individually controlled product distribution lines.

It is a further object and feature of the invention to provide an agricultural air cart assembly with individually controlled product distribution lines wherein each distribution line is part of a self-contained unit.

It is a still further object and feature of the invention to provide an agricultural air cart assembly wherein the excess lines used on the air cart is minimized.

SUMMARY OF THE INVENTION

In accordance with the present invention, an agricultural air cart assembly is provided for transmitting a controlled volume of product from a storage compartment to a plurality of row units for depositing the product on an agricultural field. The assembly includes a first distribution line for receiving a first supply of the product from the storage container therein. A rotatable first fan is operatively connected to the first distribution line. The first fan has an intake and is configured such that rotation of the first fan draws a volume of air into the fan through the intake and outputs an air flow having a pressure into the first distribution line which entrains and carries the first supply of the product downstream toward a first row unit. A first fan shroud is movable between a fully opened position spaced from intake of the first fan and a closed position wherein first fan shroud overlaps the intake of the first fan and prevents the output of the air flow from the first fan.

A second distribution line may be provided for receiving a second supply of the product from the storage container. A rotatable second fan is operatively connected to the second distribution line. The second fan has an intake and is configured such that rotation of the second fan draws a volume of air into the second fan through the intake of the second fan and outputs an air flow having a pressure into the second distribution line which entrains and carries the second supply of the product downstream toward a second row unit. A second fan shroud is movable between a fully opened position spaced from intake of the second fan and a closed position wherein second fan shroud overlaps the intake of the second fan and prevents the output of the air flow from the second fan. The first and second fans are driven by a common drive mechanism.

A first meter wheel adapted for transferring the first supply of the product from the storage container to the first distribution line. The first meter wheel is adjustable to provide a desired rate at which the first supply of product is transferred to the first distribution line. A second meter wheel is adapted for transferring the second supply of the product from the storage container to the second distribution line, the second meter wheel being adjustable to provide a desired rate at which the second supply of product is transferred to the second distribution line. The first and second meter wheels may be independently driven.

A controller may be operatively connected to the first fan shroud for positioning the fan shroud at a location between the fully opened position the closed position. A first pressure sensor is operatively connected to the controller and is positioned to measure a pressure of the air flow in the first distribution line. The first pressure sensor provides a signal representative of the pressure of the air flow in the first distribution line to the controller.

In accordance with a further aspect of the present invention, an agricultural air cart apparatus is provided. The apparatus includes a storage container holding a product.

First and second distribution lines are adapted for receiving product from the storage container and transporting the product to corresponding first and second row units. First and second product metering systems communicate with the storage container. The first and second product metering systems regulating flows of product from the product hopper into the first and second distribution lines, respectively. A rotatable first fan is operatively connected to the first distribution line. The first fan has an intake and is configured such that rotation of the first fan draws a volume of air into the fan through the intake and outputs an air flow having a pressure into the first distribution line which entrains and carries the first supply of the product downstream toward a first row unit. A rotatable second fan is operatively connected to the second distribution line. The second fan has an intake and is configured such that rotation of the second fan draws a volume of air into the second fan through the intake of the second fan and outputs an air flow having a pressure into the second distribution line which entrains and carries the second supply of the product downstream toward a second row unit. A controller is operable to adjust the pressures of the air flows outputted by the first and second fans.

The first and second product metering systems are operatively connected to the storage container and are configured to regulate the flows of product from the storage container into the first and second distribution lines. Each of the first and second product metering systems includes a meter wheel configured to rotate to regulate a rate at which the product flows from the storage container into a corresponding one of the first and second distribution lines to a desired rate. A first distribution manifold has an input coupled to the first distribution line and an output coupled to the first row unit. Likewise, a second distribution manifold has an input coupled to the second distribution line and an output coupled to the second row unit. A first pressure sensor is operatively connected to the controller and is positioned within the first distribution manifold to measure a pressure of the air flow therein. The first pressure sensor provides a signal representative of the pressure of the air flow in the first distribution manifold to the controller. A second pressure sensor is operatively connected to the controller and is positioned with the second distribution manifold to measure a pressure of the air flow in the second distribution manifold. The second pressure sensor provides a signal representative of the pressure of the air flow in the second distribution manifold to the controller. The controller adjusts the pressure of the air flow outputted by the first fan in response to the signal received from the first pressure sensor and adjusts the pressure of the air flow outputted by the second fan in response to the signal received from the second pressure sensor.

A first fan shroud is operatively connected to the controller and is movable between a fully opened position spaced from intake of the first fan and a closed position wherein first fan shroud overlaps the intake of the first fan and prevents the output of the air flow from the first fan. A second fan shroud is operatively connected to the controller and is movable between a fully opened position spaced from intake of the second fan and a closed position wherein second fan shroud overlaps the intake of the second fan and prevents the output of the air flow from the second fan. The controller is configured to position the first fan shroud at a location between the fully opened position the closed position to optimize the pressure of the air flow in the first distribution line and to position the second fan shroud at a location between the fully opened position the closed position to optimize the pressure of the air flow in the second distribution line.

In accordance with a still further aspect of the present invention, an agricultural air cart apparatus including a product hopper for holding a product and first and second product metering systems communicating with the product hopper to regulate a flow of product from the product hopper is provided. The apparatus is characterized in that first and second distribution lines are adapted for receiving product from the product hopper and transporting the product to corresponding first and second row units. The first and second product metering systems regulate flows of product from the product hopper into the first and second distribution lines, respectively. A rotatable first fan has an intake and output in communication with the first distribution line. The first fan is configured to draw a volume of air into the first fan through the intake and output an air flow having a pressure into in the first distribution line which entrains and carries the first supply of the product downstream toward a first row unit. A rotatable second fan has an intake and output in communication with the second distribution line. The second fan is configured to draw a volume of air into the second fan through the intake and output an air flow having a pressure into the second distribution line which entrains and carries the second supply of the product downstream toward a second row unit. The pressures of the air flowing in the first and second distribution lines are independently controlled.

A first fan shroud is operatively connected to the first fan and is movable between a fully opened position spaced from intake of the first fan and a closed position wherein first fan shroud overlaps the intake of the first fan and prevents the output of the air flow from the first fan. A second fan shroud is operatively connected to the second fan and is movable between a fully opened position spaced from intake of the second fan and a closed position wherein second fan shroud overlaps the intake of the second fan and prevents the output of the air flow from the second fan. A controller is operatively connected to the first and second fan shrouds for positioning the first and second fan shrouds at locations between the fully opened positions and the closed positions, the locations of the first and second fan shrouds setting the pressures of the air flowing in the first and second distribution lines. A first pressure sensor is operatively connected to the controller and is positioned to measure a pressure of the air flow in the first distribution line. The first pressure sensor provides a signal representative of the pressure of the air flow in the first distribution line to the controller. A second pressure sensor is operatively connected to the controller and is positioned to measure a pressure of the air flow in the second distribution line. The second pressure sensor provides a signal representative of the pressure of the air flow in the second distribution line to the controller. Each of the first and second product metering systems includes a meter wheel configured to rotate to dispense the product at a desired rate.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 6 is a schematic sectional representation, similar to FIG. 5, of an individual delivery unit for the agricultural air cart assembly of the present invention depicting the fan shroud of the delivery unit in a closed position.

DETAILED DESCRIPTION OF THE DRAWINGS

Figure 1:
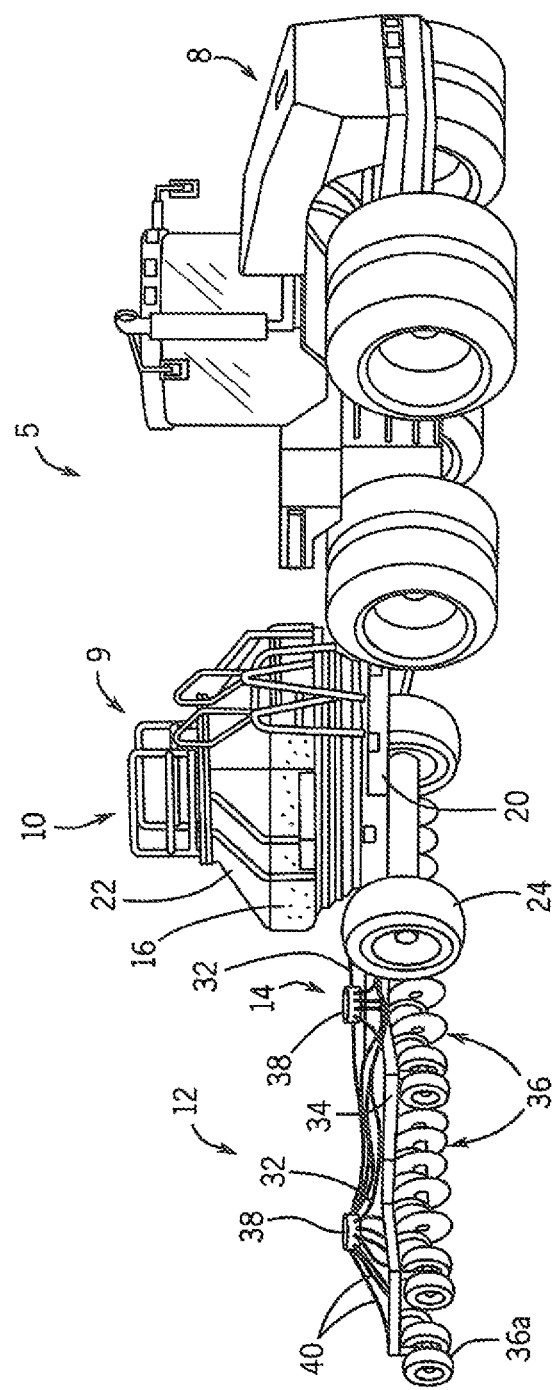
FIG. 1 is an isometric view of a tractor pulling an implement coupled to an agricultural air cart assembly in accordance with the present invention.

Referring to FIG. 1, an agricultural particulate material delivery system 5 is shown that includes a tractor 8 and an agricultural air cart assembly 9. The agricultural air cart assembly 9 includes, e.g. an air cart 10 such as a PRECISION AIR cart available from the Case IH company, and a material dispensing implement, e.g. a drill 12. As is conventional, the drill 12 includes a frame 34 to which a set of row units 36 is coupled. By way of example, the row units 36 may take the form of a plurality of disc-style opener units 36a, FIG. 1, or a plurality of tip-type opener units 36b, FIG. 2. The row units 36 are configured to cut a furrow into the soil and deposit the product 16 therein. Seed row finishing equipment such as wheel packers or closing wheels 42 may be arranged on the drill 12, such as the embodiment shown in FIG. 2 for closing the furrow(s).

The air cart 10 and the drill 12 are hitched to the tractor 8 and/or each other in a conventional manner. The agricultural air cart assembly 9 further includes a pneumatic distribution system 14 operatively connected to the air cart 10 and the drill 12 for pneumatically delivering product 16 from the air cart 10 to the drill 12 for pneumatic distribution, of the product 16 to an agricultural field. By way of example, the product 16 is a particulate material that may be seed, such as small grains, and/or fertilizer, such as dry granular fertilizer.

Figure 3:
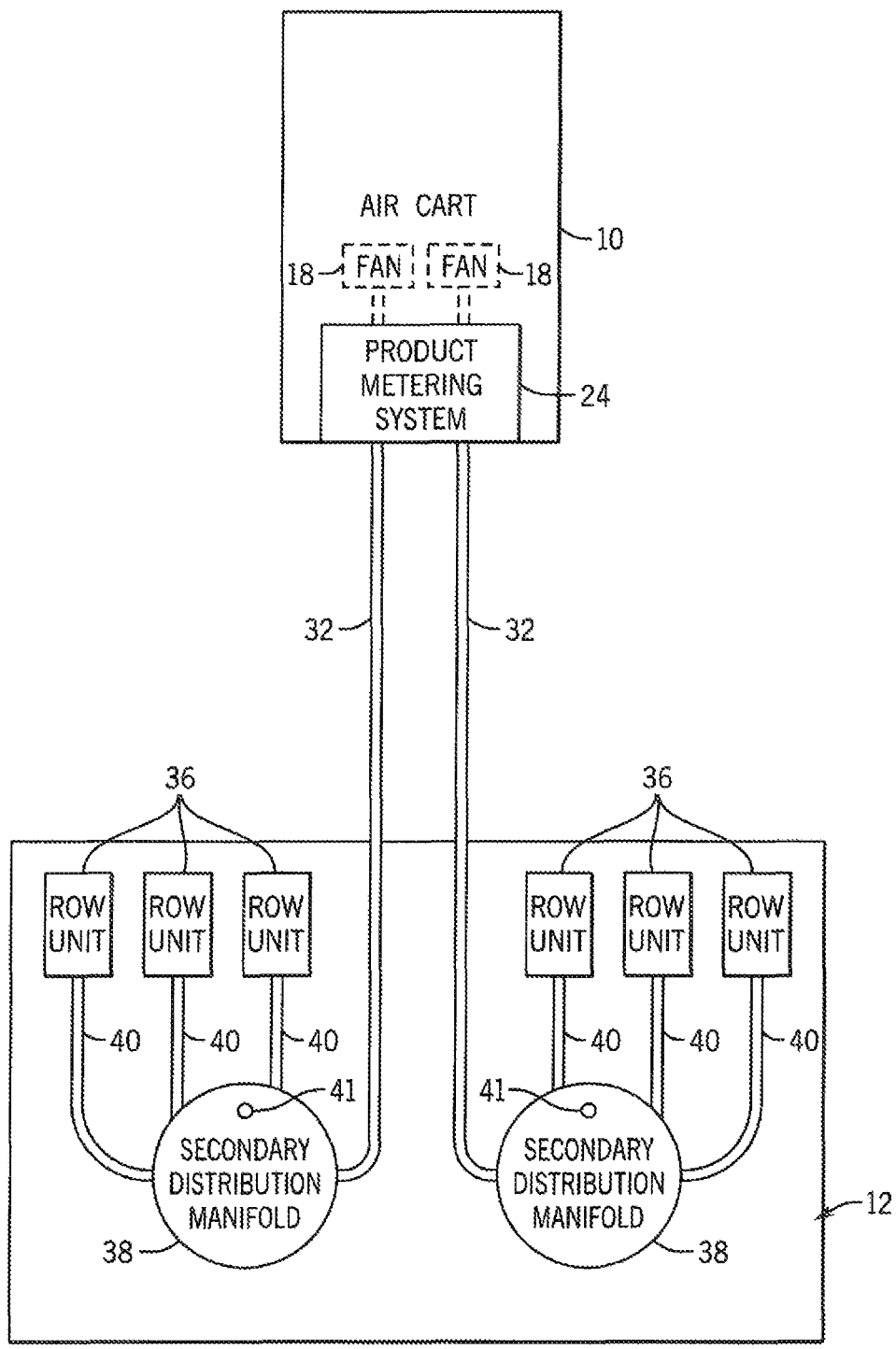
FIG. 3 is a schematic diagram of the agricultural air cart assembly of the present invention coupled to an implement.
Figure 4:
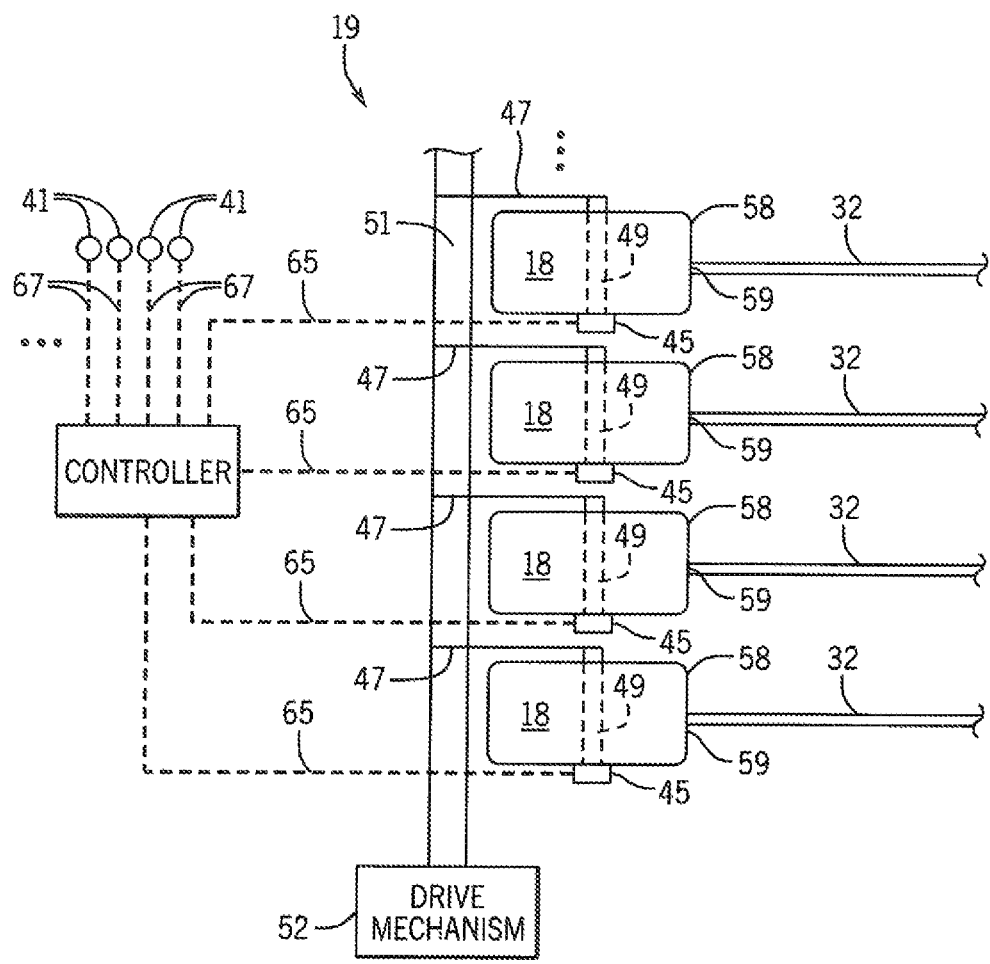
FIG. 4 is a schematic diagram of a fan assembly of the agricultural air cart assembly of the present invention for delivering airflow to dedicated distribution lines.
Figure 5:
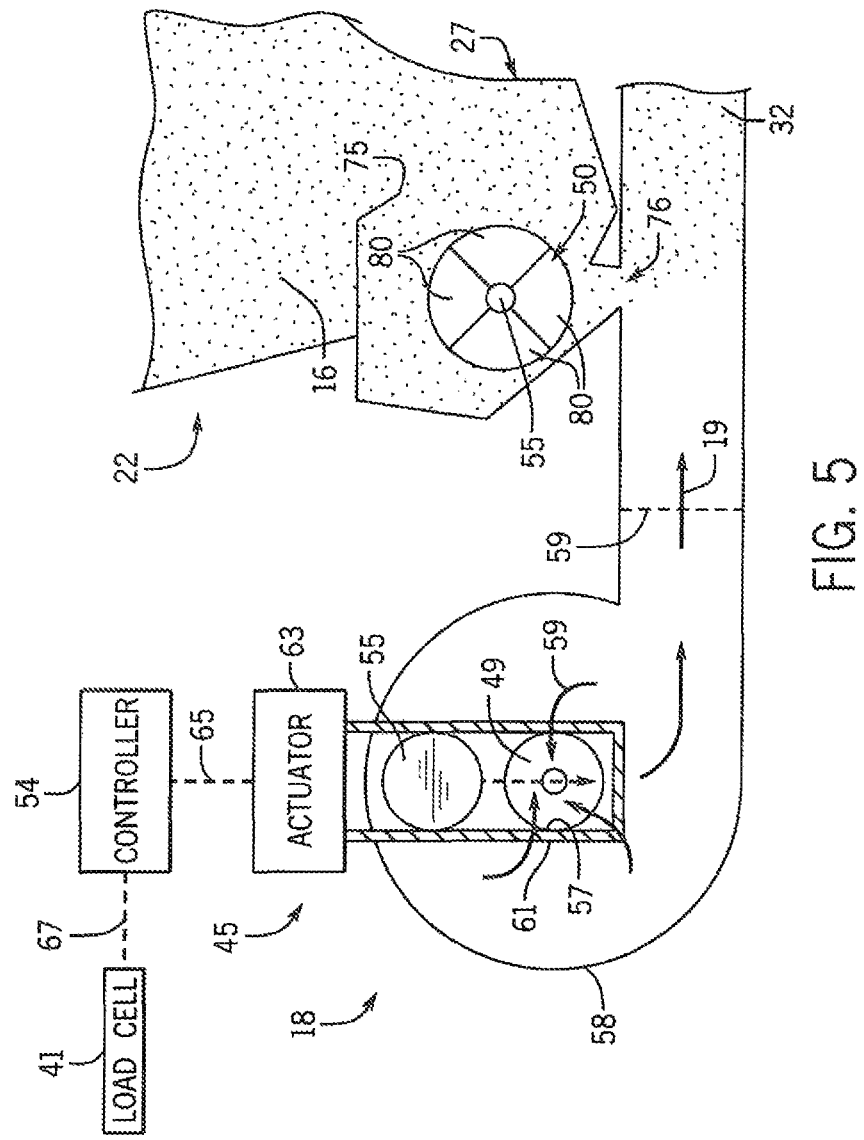
FIG. 5 is a schematic sectional representation of an individual delivery unit for the agricultural air cart assembly of the present invention depicting a fan shroud of the delivery unit in a fully opened position.

As hereinafter described, a controller 54, FIGS. 3-5, is configured to adjust the air flows in each of a plurality of distribution units 17 of pneumatic distribution system 14, to thereby control distribution of the product 16 from the storage compartments 22 of the air cart 10 to the drill 12. It is contemplated for an operator to enter the configuration of the agricultural air cart assembly 9 into the controller 54 and the desired operating parameters thereof. This configuration may be entered manually, for example, from a pull-down menu presented to the operator. Optionally, the agricultural air cart assembly 9 may include an identifier and the controller 54 may be configured to automatically detect the identifier and determine the agricultural air cart assembly 9 connected to the tractor 8. The controller 54 may include an industrial, computer or, e.g., a programmable logic controller (PLC), along with corresponding software and suitable memory for storing such software and hardware, for controlling various components of the agricultural air cart assembly 9, as hereinafter described. A database stored in a memory device may include additional configuration parameters such as the number of storage compartments 22 present on the air cart 10, the number of row units 36 of the drill 12 and the like.

Figure 2:
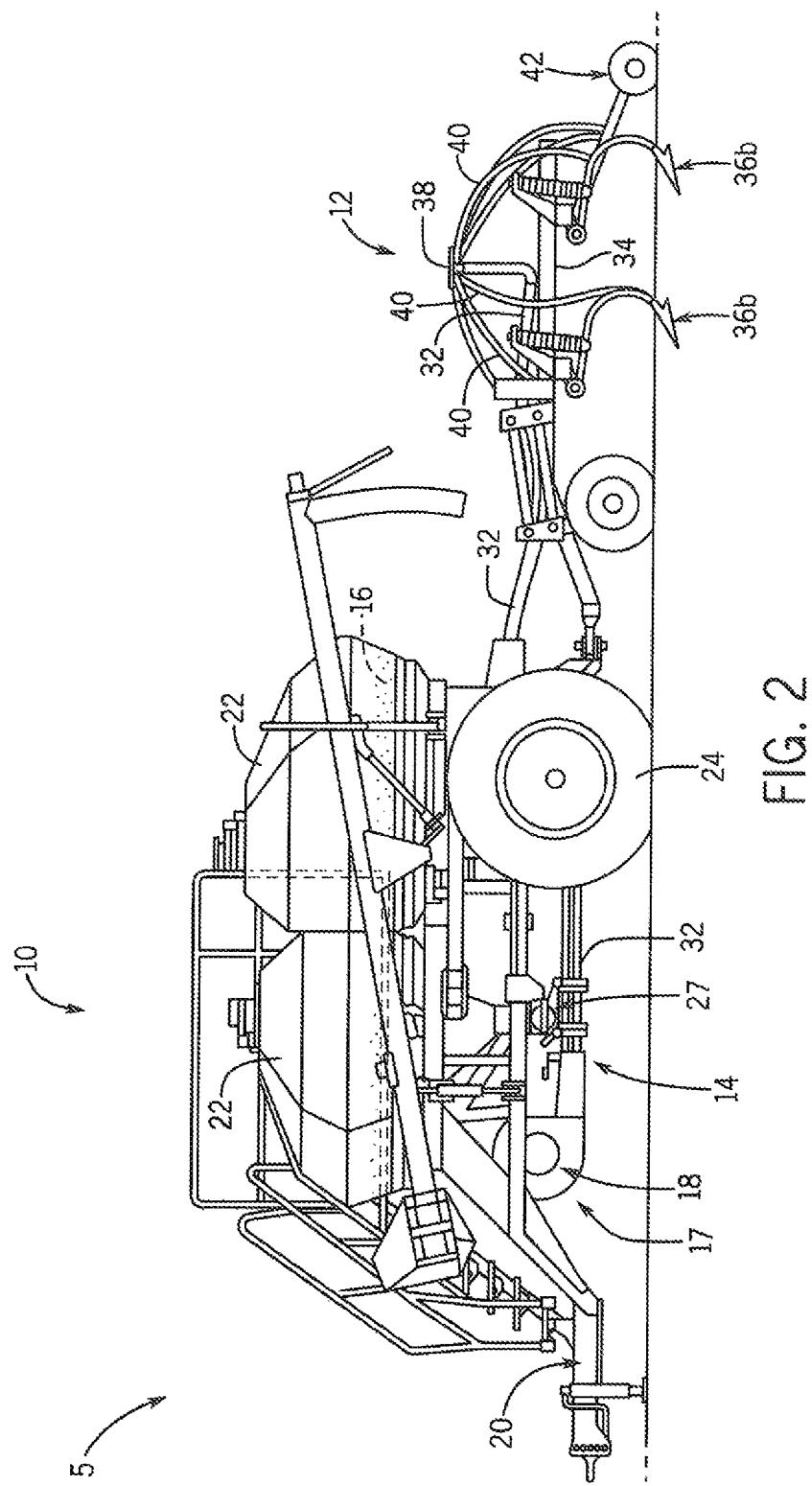
FIG. 2 is a side view of the agricultural air cart assembly of the present invention coupled to the implement of FIG. 1.

Referring to FIGS. 1 and 2, the air cart 10 includes a frame 20 to which storage compartments 22 and wheels 24 are mounted. As hereinafter described, the pneumatic distribution system 14 is configured to supply a controlled volume of product 16 from the storage compartments 22 to corresponding, individual distribution lines 32, at desired delivery rates, so that the product 16 can be variably distributed to different portions of the drill 12 and different locations on the agricultural field. More specifically, the pneumatic distribution system 14 of the agricultural air cart assembly 9 includes a plurality of distribution units 17 arranged in a side-by-side relationship along the underside of air cart 10, FIG. 4.

As seen in FIGS. 4-6, each of the distribution units 17 includes a fan 18 for generating an air flow generally designated by the reference numeral 19, directed through a corresponding distribution line 32. As hereinafter described, each fan 18 includes a corresponding drive shaft 49 operatively connected to and driven by a common shaft 51 which, in turn, is operatively connected to a common drive mechanism 52 by a belt, hydraulics or the like. The product 16 supplied by the product metering unit 27 to the distribution line 32 becomes entrained in the air flow 19 through the distribution line 32 and carried by the air flow 19 downstream, as hereinafter described. Each of the distribution units 17 also includes a product metering unit 27 having a meter wheel 50 for dispensing the product 16 to the pneumatic distribution system 14 for delivery. The meter wheel 50 of each distribution unit 17 is operatively connected to and driven by a drive mechanism (not shown) directly or via linkage such as a transmission, a drive belt or the like. Hence, the rotational speed of the meter wheel 50 may be varied by varying the speed of the motor or adjusting the linkage connecting the motor thereto.

The meter wheel 50 of each product metering unit 27 is arranged between the intake 75 and the exit 76 of the product metering unit 27 and may be supported by a rotatable shaft 55 extending concentrically through the meter wheel 50. Each meter wheel 50 has a drum-like configuration and includes multiple compartments 80 circumferentially spaced about the outer periphery thereof. The compartments 80 are sized to convey and control the volume and rate of product 16 transferred from the storage compartment 22, through the exit 76 of product metering unit 27, and into to distribution lines 32, for reasons hereinafter described.

As heretofore described, each of the distribution units 17 also includes a fan 18 associated with a corresponding distribution line 32. Each fan 18 is support on a corresponding drive shaft 49 which is operatively connected to common drive shaft 51 by linkage 47, such as a drive belt or the like, FIG. 4. Each fan 18 provides the air flow 19 in distribution lines 32 so as entrain the product 16 supplied by the product metering unit 27 to the distribution line 32, as heretofore described. As is conventional, each fan 18 includes fan housing 58 housing a plurality of circumferentially spaced blades or ribs which extend radially from a central hub. The central hub is operatively connected to and rotates with drive shaft 49 which extends into fan housing 58. Fan housing 58 further includes intake 57, FIG. 5, axially aligned with drive shaft 49 and being adapted for drawing air 59 in response to rotation of the fan blades of fan 18. As the central hub, and hence the fan blades, are rotated by drive shaft 49, air 59 is drawn into fan housing 58 through intake 57, turns 90 degrees and accelerates due to centrifugal force as it flows over the fan blades and exits output 59 of fan housing 58 as air flow 19. Output 59 of fan housing 58 of each fan 18 is in communication with a corresponding distribution line 32.

It can be appreciated that by varying the dimensions of intake 57, the volume air drawn into intake 57 during rotation of the fan blades of a corresponding fan 18 may be varied, thereby varying the volume, and hence the pressure, of air flow 19 in distribution line 32. More specifically, it is contemplated to operatively connect fan shroud assemblies 45 to fans 18. Fan shroud assemblies 45 include fan shrouds 55 which are independently controllable and which selectively vary the dimensions of intakes 57 of fans 18 to control the pressures of the air flows 19 in distribution lines 32. Hence, by adjusting the volume of the air 59 drawn into fan housing 58 through intake 57, the pressure of the an flow 19 exiting output 59 of fan housing 58 is proportionally reduced.

Each fan shroud assembly 45 includes fan shroud 55 defined by a generally circular plate 59 movable between a fully opened position, FIG. 5, wherein fan shroud 55 is spaced from intake 57 of fan 18, and a closed position, FIG. 6, wherein fan shroud 55 overlaps intake 57 and prevents air 59 from being drawn into fan housing 58 through intake 57. It is contemplated for fan shroud 55 to assume various positions between the fully opened position and the closed position, such at fan shroud 55 partially obscures intake 57. In this manner, the position of fan shroud 55 may be used to control the volume of the air 59 drawn into fan housing 58 through intake 57. As a result, by varying the position of fan shroud 55, air flow 19 exiting output 59 of fan housing 58 may range between zero fin other words, no air flow exiting output 59 of fan housing 58) and a maximum air flow that may be generated by fan 18 at its operating speed. Hence, as described, the rotational speeds of the fans 18 do not need to be adjusted in order to change or optimize the volume of air entering the primary distribution lines 32. Rather, a single speed for all fans 18 may be implemented and the volumes of air entering the primary distribution lines 32 may be adjusted by simply adjusting the positions of corresponding fan shrouds 55.

Fan shroud assemblies 45 further include guides 61 which guide movement of fan shrouds 55 between the fully opened and closed positions. In addition, actuators 63 are operatively connected to fan shrouds 55 to control movement of fan shrouds 55 between the fully opened and closed positions. Actuators 63, in turn, are operatively connected to controller 54 by lines 65. As hereinafter described, controller 54 individually controls actuation of actuators 63 to adjust the position of fan shrouds 55, and hence, the pressures of the air flows 19 in distribution lines 32. In other words, by varying the position of fan shroud 55, the volume of the air flowing fan 18 and the pressure of the air flow 19 in a corresponding distribution line 32 may be increased or decreased to an optimal level.

As best seen in FIG. 3, each distribution line 32 is connected to and in communication with a corresponding secondary distribution manifold 38 supported on the frame 34 of the drill 12. It is intended for the product 16 entrained in the air flow 19 in distribution line 32 to be supplied to the secondary distribution manifold 38 under pressure. It is contemplated for each secondary distribution manifold 38 to include a pressure sensor such as a load cell 41 provided therein for measuring the pressure of the air flow 19 received. For reasons hereinafter described, the load cells 41 are operatively connected to controller 54 by lines 67 for providing controller 54 with a signal corresponding to the pressure detected. Generally, the number of secondary distribution manifolds 38 will match the number of distribution lines 32.

As is conventional, each secondary distribution manifold 38 has a single opening or input for receiving product 16 entrained in the air flow 19 in a corresponding distribution line 32 and a plurality of outputs, each of which is in communication with a corresponding secondary distribution line 40. Each secondary distribution manifolds 38 collects product 16 received at the input thereof and causes product 16 to be distributed among secondary distribution lines 40. While three secondary distribution lines 40 are depicted in FIG. 3 as emanating from each secondary distribution manifold 38, any number of secondary distribution lines 40 may be used without deviating from the scope of the present invention.

In operation, product 16 is loaded into the storage compartments 22 of the air cart 10. The tractor 8 tows the agricultural air cart assembly 9 and the drill 12 for pneumatic distribution of product 16 through the agricultural field. Controller 54 causes actuator 63 to move fan shrouds 55 of fans 18 to a desired position, e.g. their fully opened positions, and fans 18 are activated such that the pneumatic distribution system 14 transfers product 16 using the distribution units 17 to distribution lines 32. Product 16 flows through the distribution lines 32 to secondary distribution manifolds 38 positioned on the drill 12 wherein the secondary distribution manifolds 38 distributes product 16 through secondary distribution lines 40 to the row units 36 for distribution into the furrows formed thereby.

It can be appreciated that as the tractor 8 is towed across the agricultural field, the rotational speed of the meter wheels 50 may be varied individually or collectively by a user or in accordance with the operating instructions of a controller, e.g. controller 54, such that each meter wheel supplies a desired amount of product 16 to a corresponding distribution line 32. Each fan 18 of the plurality of distribution units 17 provides air flow 19 in distribution lines 32, as heretofore described, so as to entrain product 16 supplied to the distribution line 32 and carry product 16 to the secondary distribution manifold 38 under pressure. Each secondary distribution manifolds 38 collects product 16 received at the input thereof and causes product 16 to be distributed among secondary distribution lines 40 to corresponding row units 36, wherein product 16 is deposited in the corresponding furrows cut thereby.

As previously described, the pressure of air flows 19 arriving at the inputs of the secondary distribution manifolds 38 is monitored by load cells 41 to insure that the proper volume of air is being delivered, thereto. The pressure measurements of load cells 41 of the secondary distribution manifolds 38 are provided to controller 54 which determines if the air pressures in the secondary distribution manifolds 38 are consistent and within acceptable levels. If the air pressures in the secondary distribution manifolds 38 are consistent and within acceptable levels, the positions of the fan shrouds 55 of fans 18 are maintained, e.g., the fan shrouds 55 of fans 18 are maintained in their fully opened positions.

If the air pressures in one or more of the secondary distribution, manifolds 38 are determined by controller 54 to be inconsistent with the other secondary distribution manifolds 38 and/or outside of acceptable levels in response to the pressure measurements of load cells 41 of the secondary distribution manifolds 38, controller 54 actuates actuators 63 of the fans 18 associated with the one or more of the secondary distribution manifolds 38 which have measured air pressures inconsistent with the other secondary distribution manifolds 38 and/or outside of acceptable levels so as to adjust the positions of the corresponding fan shrouds 55. By adjusting the positions of the one or more fan shrouds 55, the volumes of the air flowing from fans 18 and the pressures of the air flows 19 in corresponding distribution lines 32 may be increased or decreased to an optimal level. Thereafter, load cells 41 continue to measure the pressures of the air flows 19 in secondary distribution manifolds and provide controller 54 with signals corresponding to the pressures detected such that controller 54 may continually adjust the positions of the one or more fan shrouds 55 to maintain the pressures of the air flows 19 in corresponding distribution lines 32 at optimal levels.

The variable control of air flows 119 to the secondary distribution manifolds 38 and of products 16 supplied to distribution lines 32 provides a number of advantages. For example, the lengths of the primary distribution lines 32 may be adapted for the distance required to travel on the agricultural apparatus, and do not need to be uniform. In this manner, excess length of distribution lines 32 may be omitted. Another advantage is that it is easy to individually control the amount of air supplied to each distribution line 32 or product delivered to each distribution line 32, thus, adding flexibility to the machine's operation. In addition, by providing a plurality of self-contained distribution units 17 arranged in a side-by-side relationship along the underside of air cart 10, the agricultural air cart assembly 9 is easier to maintain and repair. Further, the air pressures in distribution lines 32 may be individually controlled to adapt to different types of products 16 traveling therethrough.

While fan shrouds 55 are shown to be used with multiple fans 18 which are driven by a common shaft 51 which, in turn, is operatively connected to a common drive mechanism 52 by a belt, hydraulics or the like, it is contemplated that fan shrouds 55 may be used in connection with independently driven fans 18. In such an arrangement, not only may fan shrouds 55 be used to maintain the pressures of the air flows 19 in corresponding distribution lines 32 at optimal levels, the rotational speeds of the fans 18 may be individually adjusted to further tune the pressures of the air flows 19 in corresponding distribution lines 32 to optimal levels.

Many changes and modifications could be made to the invention without departing from the spirit thereof. The scope of these changes will become apparent from the appended claims.

I claim:

1. An agricultural air cart assembly for transmitting a controlled volume of product from a storage container to a plurality of row units for depositing the product on an agricultural field, comprising:
   a first distribution line for receiving a first supply of the product from the storage container therein;
   a rotatable first fan being operatively connected to the first distribution line, the rotatable first fan having an intake and being configured such that rotation of the rotatable first fan draws a volume of air into the rotatable first fan through the intake and outputs an air flow having a pressure into the first distribution line which entrains and carries the first supply of the product downstream toward a first row unit;
   a first fan shroud movable between a fully opened position spaced from the intake of the rotatable first fan and a closed position wherein the first fan shroud overlaps the intake of the rotatable first fan and prevents the output of the air flow from the rotatable first fan;
   a second distribution line for receiving a second supply of the product from the storage container therein;
   a rotatable second fan being operatively connected to the second distribution line, the rotatable second fan having an intake and being configured such that rotation of the rotatable second fan draws a volume of air into the rotatable second fan through the intake of the rotatable second fan and outputs an air flow having a pressure into the second distribution line which entrains and carries the second supply of the product downstream toward a second row unit; and
   a second fan shroud movable between a fully opened position spaced from intake of the rotatable second fan and a closed position wherein the second fan shroud overlaps the intake of the rotatable second fan and prevents the output of the air flow from the rotatable second fan.

2. The assembly of claim 1 wherein the first and second rotatable fans are driven by a common drive mechanism.

3. The assembly of claim 1 further comprising a first meter wheel adapted for transferring the first supply of the product from the storage container to the first distribution line, the first meter wheel being adjustable to provide a rate at which the first supply of product is transferred to the first distribution line.

4. The assembly of claim 3 further comprising:
   a second distribution line for receiving a second supply of the product from the storage container therein;
   a rotatable second fan being operatively connected to the second distribution line, the rotatable second fan having an intake and being configured such that rotation of the rotatable second fan draws a volume of air into the rotatable second fan through the intake of the rotatable second fan and outputs an air flow having a pressure into the second distribution line which entrains and carries the second supply of the product downstream toward a second row unit;
   a second fan shroud movable between a fully opened position spaced from the intake of the rotatable second fan and a closed position wherein the second fan shroud overlaps the intake of the rotatable second fan and prevents the output of the air flow from the rotatable second fan; and
   a second meter wheel adapted for transferring the second supply of the product from the storage container to the second distribution line, the second meter wheel being adjustable to provide a rate at which the second supply of product is transferred to the second distribution line.

5. The assembly of claim 4 wherein the first and second meter wheels are independently driven.

6. The assembly of claim 1 further comprising:
   a controller operatively connected to the first fan shroud for positioning the first fan shroud at a location between the fully opened position the closed position; and
   a first pressure sensor operatively connected to the controller and being positioned to measure a pressure of the air flow in the first distribution line, the first pressure sensor providing a signal representative of the pressure of the air flow in the first distribution line to the controller.

* * * * *